United States Patent
Fischer et al.

[11] 3,748,020
[45] July 24, 1973

[54] CATADIOPTRIC OPTICAL SYSTEM HAVING MULTILAYER FILTER REFLECTOR

[75] Inventors: Robert E. Fischer, Carlisle; Wayne Knapp, Sudbury; George R. Wirtenson, Acton, all of Mass.

[73] Assignee: Itek Corporation, Lexington, Mass.

[22] Filed: Mar. 31, 1972

[21] Appl. No.: 240,066

[52] U.S. Cl............... 350/199, 350/196, 350/202, 350/293
[51] Int. Cl. .......................................... G02b 17/00
[58] Field of Search............... 350/196, 199, 200, 350/201, 293, 294, 27–29, 55

[56] References Cited
UNITED STATES PATENTS
| | | | |
|---|---|---|---|
| 3,259,012 | 7/1966 | Locquin | 350/199 X |
| 3,604,785 | 9/1971 | Travis et al. | 350/199 X |
| 3,137,827 | 6/1964 | Pierce | 350/294 X |
| 3,377,912 | 4/1968 | Yates | 350/196 UX |

FOREIGN PATENTS OR APPLICATIONS
1,257,192  2/1961  France................. 350/201

*Primary Examiner* — John K. Corbin
*Attorney* — Homer O. Blair, Robert L. Nathans et al.

[57] ABSTRACT

A catadioptric optical system for improving the quality of the image and the transmittance of the optical system. The invention is an improvement on the Cassegrain and Newtonian optical systems or any other optical systems wherein the secondary mirror partially obscures the primary mirror. The secondary mirror in these optical systems is provided with a multilayer, angle sensitive, filter coating, with the coating being designed to pass to the primary mirror substantially all radiation received along the optical axis and to reflect substantially all radiation received at angles of incidence other than along said optical axis. With this arrangement radiation normally blocked by the secondary mirror is passed to the primary mirror which results in an effective increase in the transmittance of the optical system and an improved modulation transfer function for the optical system.

4 Claims, 6 Drawing Figures

NEWTONIAN OPTICAL SYSTEM

CASSEGRAIN OPTICAL SYSTEM

CATADIOPTRIC OPTICAL SYSTEM HAVING MULTILAYER FILTER REFLECTOR

BACKGROUND OF THE INVENTION

The present invention relates generally to the field of obscured optical systems, and more particularly pertains to an improvement in such optical systems whereby radiation normally blocked by the secondary mirror in each of these systems is passed to the primary mirror.

Most reflecting optical systems of the prior art require an obstruction to the primary mirror in the form of a secondary mirror to reflect converging radiation from the primary mirror to a convenient image location. This optical arrangement has two primary disadvantages. First, the amount of radiation reaching the image plane is reduced from that of an unobscured system of the same F/number. To regain the loss of the obscured radiation optical designers are required to use lower F/number systems. For example, in an F/4 optical system wherein the secondary mirror blocks 50 percent of the incoming radiation, the illumination at the image plane is equivalent to an F/5.66 unobscured system. In order to achieve the same illumination at the image plane as an unobscured F/4 system, an F/2.83 system would be required. The primary mirror of an F/2.83 system is 1.4 times the diameter of the unobscured F/4 system. The larger F/2.83 system requires the primary mirror to be larger and heavier, and therefore more expensive. Further, geometric aberrations are more difficult to correct in a lower F/number system, and this results in a degradation of the final optical performance of the system. Second, the obscuration by the secondary mirror reduces the modulation transfer of the optical system and thus reduces image quality.

Some prior art optical systems employ a beam splitting folding mirror of 50 percent transmission over its full aperture. Such a system contains no central obstruction. However, typically 75 percent or more of the incident radiation is lost in the beam splitter.

It would be desirable to have a telescope wherein radiation normally blocked by the secondary mirror of the telescope is permitted to pass to the primary mirror.

SUMMARY OF THE INVENTION

In accordance with a preferred embodiment, a catadioptric optical system is disclosed for improving the quality of the image produced by the optical system. In the catadioptric optical system the secondary mirror, which is positioned at a given angle relative to the optical axis of the optical system, has an angle sensitive filter coating applied to it. The angle sensitive filter coating is designed to pass substantially all radiation incident on the secondary mirror along the optical axis of the telescope at the given angle. The angle sensitive filter coating reflects substantially all radiation incident on it at angles other than said given angle. This arrangement results in incoming radiation along the optical axis of the optical system being passed through the secondary mirror to the primary mirror, and then being reflected by the primary mirror back to the secondary mirror for further reflection to an image plane. The catadioptric optical system results in an increase in the effective F/number of the optical system for a given diameter of focal length of the primary mirror and also an improvement in the modulation transfer function of the optical system. Further, the preferred embodiment provides an optical system having a reduced weight and size mirror system without degraded optical performance as would be expected in a prior art system of equivalent weight and size which does not utilize the teachings of this invention.

Although the two illustrated embodiments of this invention are telescopic optical systems, the teachings of this invention extend to all optical systems wherein a secondary mirror normally partially obscures a primary mirror.

DESCRIPTION OF A PREFERRED EMBODIMENT

Figure 1:
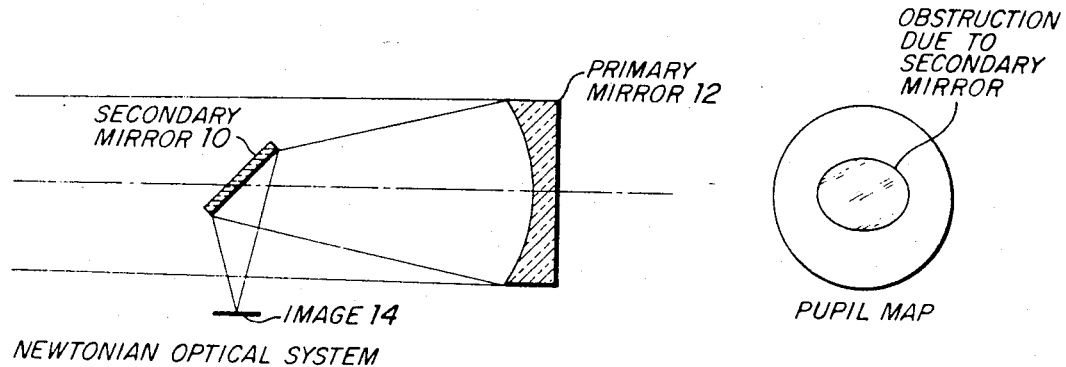
FIG. 1 illustrates a Newtonian optical system constructed in accordance with the teachings of the prior art.
Figure 2:
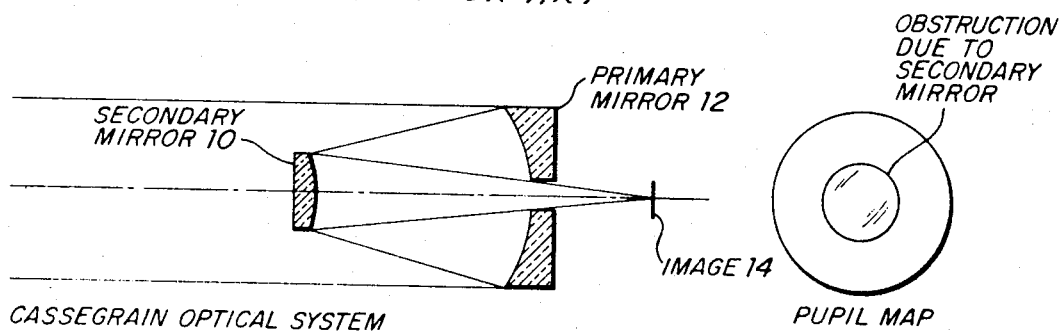
FIG. 2 illustrates a typical prior art Cassegrain optical system.

FIGS. 1 and 2 illustrate respectively Newtonian and Cassegrain optical systems constructed in accordance with the teachings of the prior art. As illustrated by FIGS. 1 and 2, reflecting optical systems of the Newtonian or Cassegrain types have an obstruction in the form of a secondary mirror 10 to reflect converging radiation from a primary mirror 12 to a convenient image plane 14. The right sides of FIGS. 1 and 2 illustrate the circle of radiation obstructed by the secondary mirrors. The radiation blocked by the secondary mirrors result in an effective decrease in the transmittance of each optical system and a degraded modulation transfer function for each optical system.

Figure 3:
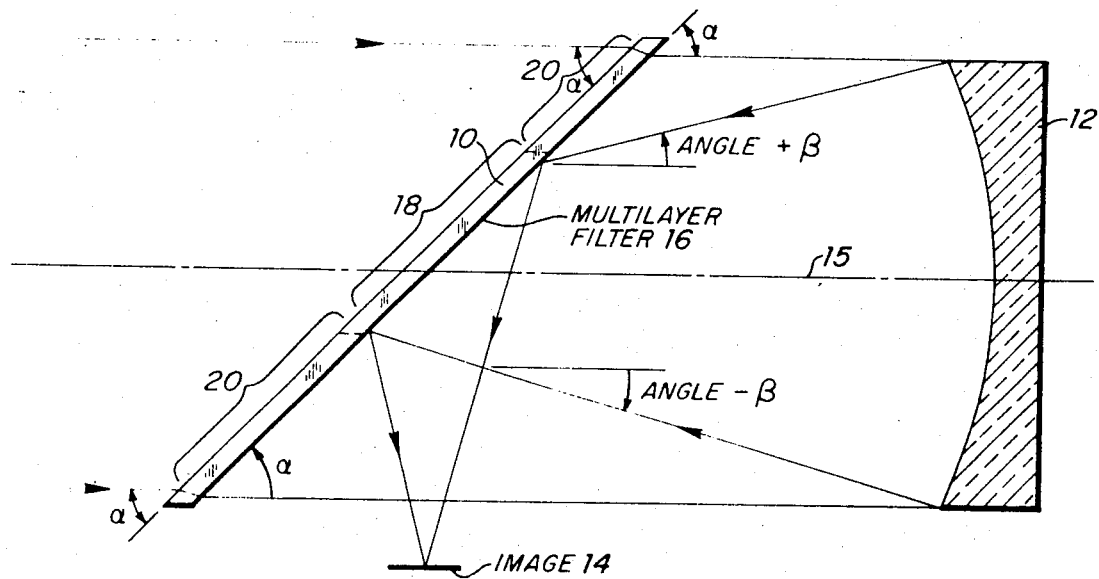
FIG. 3 illustrates one embodiment wherein the teachings of this invention are applied to a Newtonian optical system.

FIG. 3 illustrates one embodiment of this invention wherein the teachings of this invention are applied to a Newtonian optical system. In the optical system illustrated in FIG. 3, the secondary mirror 10 extends across the entire aperture of the primary mirror, and has an angle sensitive multilayer filter coating 16 thereon. A narrow bandpass multilayer filter is capable of reflecting or transmitting different amounts of nearly monochromatic radiation as a function of the angle of incidence of the radiation. In this illustration, all angles will be referenced to the optical axis 15 of the optical system. Radiation incident on the secondary mirror at an angle $\alpha$ and along the optical axis of the optical system passes through the secondary mirror 10 to the primary mirror 12. The angle sensitive coating 16 is designed to transmit substantially all radiation incident thereon at an angle $\alpha$ and reflect substantially all radiation incident thereon at angles other than $\alpha$. Thus, much of the obstruction normally presented by the secondary mirror is now removed from the optical system. Radiation reflected from the primary mirror 12 will strike the secondary mirror 10 at angles of from $-\beta$ to + β. A small amount of radiation incident on the optical axis 15 will be reflected by the primary mirror 12 back along the optical axis to the secondary mirror 10 and will pass through the secondary mirror 10 as it is incident upon the secondary mirror 10 at angle α. However, substantially all radiation incident on the secondary mirror at angles greater than or less than alpha will be reflected to image plane 14. In the embodiment illustrated in FIG. 3 the secondary mirror 10 was shown across the entire system aperture for purposes of illustration. A more practical embodiment would omit the annular area 20 and only include the central area 18 in the secondary mirror as only the central area 18 reflects radiation to the image plane 14.

Figure 4:
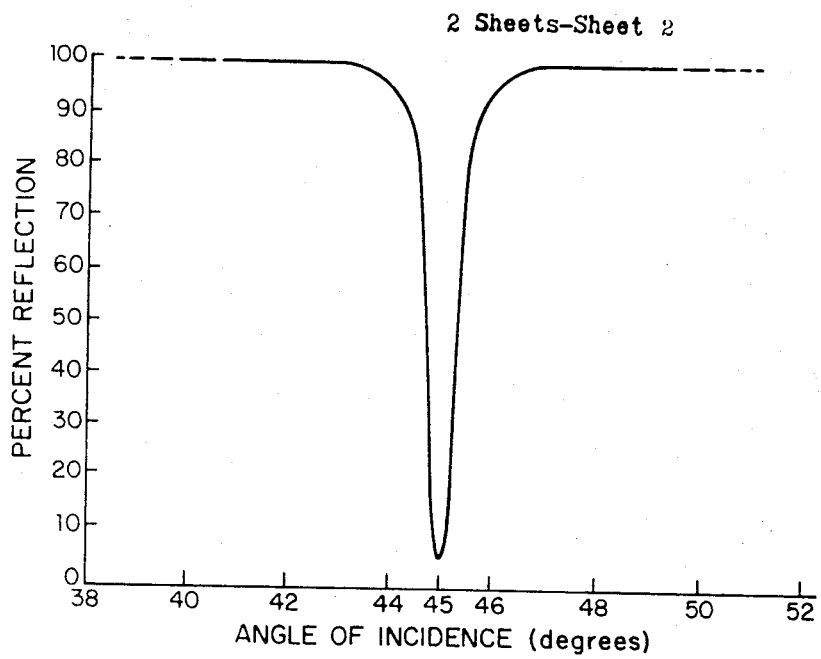
FIG. 4 is a graph of percentage reflection versus angle of incidence for one angle sensitive filter coating which may be applied to the secondary mirror illustrated in FIG. 3.

One embodiment of this invention was designed for a configuration as illustrated in FIG. 3 but with annular area 20 of the secondary mirror omitted. This embodiment was designed with an F/1.5 primary mirror and an angle α of 45°. Utilizing techniques which are well known in the art, and which are explained in Military Standardization Handbook — Optical Design, DOD–MIL–HDBK 141 (FSC–6650), Oct. 5, 1962, and particularly section 20 thereof, a 23 layer filter was designed having the theoretical transmission and reflection properties shown in FIG. 4. In FIG. 4 it may be seen that approximately 95 percent of radiation incident on the filter at an angle of exactly 45° will be transmitted by the filter. At angles of incidence of one half degree greater or less than 45°, 85 percent of the incident radiation will be reflected, and at angles of incidence 2 ½° greater or less than 45° greater than 99.9 percent of the incident radiation will be reflected. It should be noted that this graph is for radiation at one particular wavelength. In general, multilayer filters having characteristics similar to that illustrated in FIG. 4 may be designed for any desired wavelength of interest and any desired optimum angle.

The following table compares the transmission and reflection properties of a typical prior art optical system with the designed embodiment utilizing the teachings of this invention.

| | Prior Art System | Designed Embodiment |
|---|---|---|
| Percent of incident light obstructed by diagonal | 27.8% | 1.47% |
| Percent of light reflected to image by Diagonal | 95% | 99.40% |
| Total system transmission* | 68.6% | 98.53% |

*neglecting reflection losses which would be present in both systems.

Figure 5:
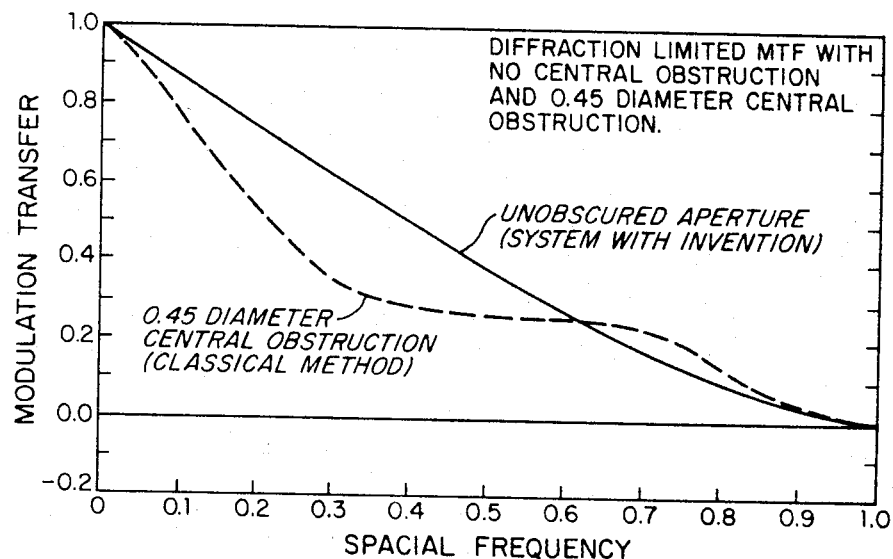
FIG. 5 is a graph of modulation transfer functions for two telescopes, one constructed in the prior art fashion and the second embodying the teachings of this invention.

FIG. 5 compares the modulation transfer function (MTF) curves of a typical prior art optical system with the designed embodiment employing the teachings of this invention. The MTF, shown as the ordinate in FIG. 5, is basically a measure of image quality with 1.0 representing a perfect image. The normalized frequency, shown as the abscissa in FIG. 5, is a measure of the spatial frequency of lines in the image. Referring to FIG. 5, it may be seen that at most frequencies an obstructed system shows a significant drop in MTF, as might be expected.

The designed embodiment is a small field, nearly monochromatic optical system. Such a system would be particularly useful in active, low light level systems utilizing a monochromatic laser source. However, it should be understood that the teachings of this invention have applicability beyond small field, nearly monochromatic systems depending upon the design of the angle sensitive filter coating.

Figure 6:
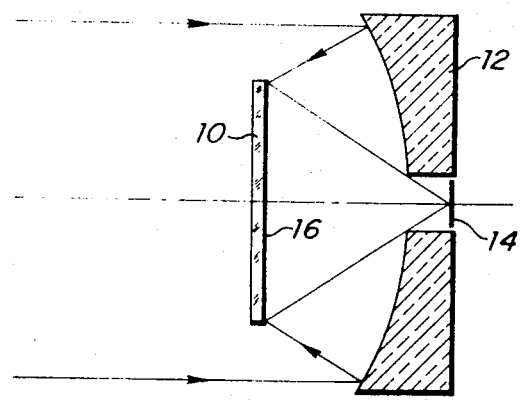
FIG. 6 shows a Cassegrain optical system constructed in accordance with the teachings of this invention.

FIG. 6 illustrates one embodiment of this invention wherein a Cassegrain optical system utilizes the teachings of this invention. In this embodiment, the angle sensitive filter coating is designed to transmit substantially all radiation incident at an angle of 90° and to reflect substantially all radiation incident at angles of other than 90°. With this embodiment a small radiation loss will be incurred by radiation which is incident on the optical axis as it will pass through the secondary mirror 10 to the image aperture and will not be reflected by the primary mirror 12. One advantage of the system illustrated in FIG. 6 is that since the radiation is passed through the filter at 90°, polarization effects, which might otherwise have to be taken into account, may be disregarded. While several embodiments have been described, the teachings of this invention will suggest many other embodiments to those skilled in the art.

We claim:

1. A Catadioptric telescope for improving the quality of the image produced by the telescope and comprising:
   a. a primary mirror placed along the optical axis of the optical system for gathering radiation;
   b. a secondary mirror for reflecting to an image plane radiation reflected by said primary mirror onto the secondary mirror;
   c. said secondary mirror being positioned at a given angle relative to the optical axis of the optical system and thereby being positioned at said given angle relative to incoming radiation along the optical axis;
   d. said secondary mirror having an angle sensitive multilayer filter coating thereon, said angle sensitive filter coating passing substantially all radiation incident thereon at said given angle and reflecting substantially all radiation incident thereon at angles other than said given angle whereby radiation normally blocked by said secondary mirror will be passed through said secondary mirror to said primary mirror and be reflected by said primary mirror back to said secondary mirror for further reflection to said image plane, thereby increasing the effective transmittance of the optical system for a given diameter and focal length of the primary mirror and improving the modulation transfer function of the optical system.

2. Apparatus as set forth in claim 1 wherein said optical system is a Cassegrain optical system wherein said given angle is approximately 90°.

3. Apparatus as set forth in claim 1 wherein said optical system is a Newtonian optical system.

4. Apparatus as set forth in claim 3 wherein said given angle is approximately 45°.

* * * * *